US006286129B1

(12) United States Patent
Agarwal et al.

(10) Patent No.: US 6,286,129 B1
(45) Date of Patent: *Sep. 4, 2001

(54) METHOD AND APPARATUS FOR COMPILING TRANSACTION PROCESSING WORKFLOWS

(75) Inventors: Suresh K. Agarwal, Sunnyvale; Roy S. Ho, San Jose; Rosemary Glavin, San Francisco; Sophia Fang-Jung Liu, San Jose, all of CA (US)

(73) Assignee: Aspect Communications, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,384

(22) Filed: Dec. 2, 1997

(51) Int. Cl.[7] .................................................. G06F 9/45
(52) U.S. Cl. ............................. 717/1; 345/334; 345/339
(58) Field of Search ............................. 395/701; 707/10, 707/1; 345/334, 339; 705/8; 379/136; 717/1

(56) References Cited

U.S. PATENT DOCUMENTS

| 4,328,556 | * | 5/1982 | Abe et al. ............................... 700/23 |
| 5,040,227 | * | 8/1991 | Lyke et al. ............................ 382/138 |
| 5,095,421 | * | 3/1992 | Freund ................................. 709/101 |
| 5,367,624 | * | 11/1994 | Cooper ................................. 345/357 |
| 5,404,523 | * | 4/1995 | DellaFera et al. ................... 709/101 |
| 5,535,322 | * | 7/1996 | Hetch ..................................... 705/1 |
| 5,586,312 | * | 12/1996 | Johnson et al. ........................ 707/10 |
| 5,623,541 | * | 4/1997 | Boyle et al. ........................... 379/136 |
| 5,644,728 | * | 7/1997 | Pillans et al. .......................... 705/43 |
| 5,664,129 | * | 9/1997 | Futatsugi et al. ..................... 345/339 |
| 5,734,837 | * | 3/1998 | Flores et al. ............................. 705/7 |
| 5,799,297 | * | 8/1998 | Goodridge et al. ..................... 707/1 |
| 5,812,989 | * | 9/1998 | Witt et al. .............................. 705/45 |
| 5,848,393 | * | 12/1998 | Goodridge et al. ..................... 705/8 |
| 5,905,493 | * | 5/1999 | Belzer et al. ......................... 345/334 |
| 5,918,226 | * | 6/1999 | Tarumi et al. ......................... 707/10 |
| 5,999,911 | * | 12/1999 | Berg et al. ............................... 705/9 |

OTHER PUBLICATIONS

Ljungberg–Holm–Hedman, "Information Technology and Organizational Effects: Supporting the Sales Process with Workflow Technology," ACM, Apr. 1997.*

* cited by examiner

*Primary Examiner*—Mark R. Powell
*Assistant Examiner*—Hoang-Vu Antony Nguyen-Ba
(74) *Attorney, Agent, or Firm*—Blakely, Sokoloff, Taylor & Zafman

(57) ABSTRACT

A system, method, and article of manufacture is provided for compiling visual primitives of a transaction flow used by a transaction processing system. Visual primitives of the transaction flow are compiled into multiple routing instructions, which may be stored in a routing table. The routing instructions are then provided to the transaction processing system. The routing instructions are stored in a database contained in the transaction processing system. The routing table is converted into a native language of the transaction processing system. The system is also capable of accessing a series of routing instructions from a transaction processing system, compiling the routing instructions into visual primitives of the transaction flow, and displaying the visual primitives of the transaction flow on a visual display.

22 Claims, 6 Drawing Sheets

| A: IF CONDITION FALSE, THEN JUMP TO D | 800 |
| --- | --- |
| STEP B | 802 |
| STEP C | 804 |
| JUMP TO F | 806 |
| STEP D | 808 |
| STEP E | 810 |
| STEP F | 812 |
| STEP G | 814 |

METHOD AND APPARATUS FOR COMPILING TRANSACTION PROCESSING WORKFLOWS

FIELD OF THE INVENTION

The present invention relates generally to improvements in customer transaction processing systems, such as telephone call processing equipment. More particularly, the invention relates to a method, apparatus, and article of manufacture for compiling transaction processing workflows.

BACKGROUND OF THE INVENTION

During recent years, automated transaction processing systems (e.g., telephone call processing systems) have increased in power and flexibility. Processing systems that are designed to aid direct telephone marketing or other telephone-based service providers have changed the configuration of physical sites. Previously, human agents at a single physical site handled inbound and outbound calls with minimal automation of agent and remote customer transactions. Today, many physical sites have been replaced by a virtual site which may be networked to multiple physical call centers that employ home and in-office workers who initiate and respond to remote customer transactions over different media, while creating and using a large amount of business-specific information.

The transformation of physical call center sites into virtual sites changes the type of business applications that users or developers must create and maintain. Originally, writing a business application for a call router consisted of defining call routing tables for a single site. Each routing table defines a workflow for describing how telephone calls and other transactions are distributed to agents, commonly referred to as automatic call distribution. Today, a business application can span multiple sites, employing distributed workflows that require the coordination of geographically distributed routing tables. Multiple software tools may be used to create various components of such systems. Because different users have different transaction flow requirements, the system for each user may become a confusing mosaic of interdependent applications, each created and maintained by different software tools. Multiple software tools may increase the difficulty in coordinating workflows across distributed execution environments, increase application development time, increase lifecycle maintenance costs, and increase the time required to make changes and enhancements to such systems.

In existing systems, the generation of routing tables or routing procedures to control transaction flows requires computer programming skills. Additionally, specific training is generally required to learn how to generate routing tables. This specialized knowledge and training is required both to generate routing tables and to edit or modify existing routing tables.

Therefore, there is a need to minimize potential confusion caused by the use of multiple software tools and simplify the generation of workflow definitions. There is a further need to coordinate workflows across distributed execution environments, reduce application development time, decrease life cycle maintenance costs, and decrease the time required to make changes to such systems.

SUMMARY OF THE INVENTION

The present invention provides a system, method, and article of manufacture for compiling visual primitives of a transaction flow used by a transaction processing system. In one embodiment of the invention, the visual primitives of a transaction flow are compiled into multiple routing instructions. The routing instructions are then provided to the transaction processing system.

Embodiments of the invention save the routing instructions in a routing table. Particular embodiments save the routing instructions to a routing table located in the transaction processing system.

Other embodiments of the invention convert the routing instructions into a native language of the transaction processing system.

An embodiment of the invention accesses routing instructions from a transaction processing system, compiles the routing instructions into visual primitives of the transaction flow, and displays the visual primitives of the transaction flow on a visual display.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
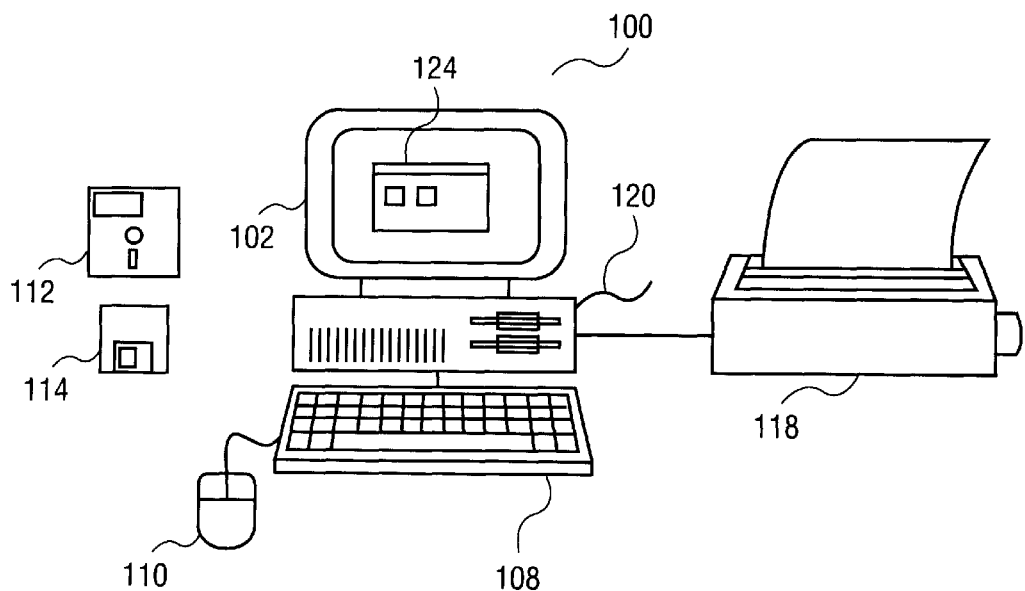
FIG. 1 is a system diagram that shows a computer hardware environment compatible with the present invention.

In the following description of the invention, reference is made to the accompanying drawings which form a part hereof, and in which is shown by way of illustration a specific embodiment in which the invention may be practiced. It will be understood that other embodiments may be utilized and structural changes may be made without departing from the scope of the present invention. A particular embodiment of the present invention, described below, enables a remote computer system user to execute a software application on a network file server.

Specific embodiments of the present invention are described below as used in a call processing system (also referred to as a call center) using call control tables (CCTs). However, it will be appreciated that the teachings of the present invention can be used in any type of transaction processing system using any type of routing instructions or routing procedures. Additionally, the teachings of the present invention may be applied to any type of routing table, and is not limited to call control tables.

The present invention provides a compilation tool that coordinates workflows across distributed execution environments, reduces application development time, decreases life cycle maintenance costs, and decreases the time required to make changes to such systems. The present invention includes a graphical application workflow editor which simplifies the creation and modification of application workflows, and reduces the time required to create business applications. The present invention also provides a flexible system for creating and modifying workflows by permitting unrestricted placement of workflow objects (e.g., steps, connections, and labels), as discussed below. A compiler is provided to convert routing instructions to visual primitives representing those instructions and for converting visual primitives to routing instructions.

The application workflow editor of the present invention provides a graphical user interface for building applications. Applications are represented as a series of steps or procedures (referred to as "workflows", "transaction flows", or "call flows"). The use of a standard user interface reduces the amount of time required to program new types of applications. Furthermore, the graphical user interface is easier to interpret than scripting languages or textual listings of steps or procedures. The graphical representation of a workflow also provides better documentation for the workflow by graphically illustrating the various steps in the workflow and connections between the steps.

A transaction processing system may handle any type of transaction (both inbound and outbound), including telephone calls, facsimile transmissions, electronic mail, video sessions, or Internet sessions. Particular embodiments of the invention refer to a call processing system, a call center, or an automatic call distributor (ACD) for purposes of explanation. However, the present invention can be used with any type of transaction processing system. Transaction processing systems can perform various functions, including receiving, transmitting, storing, queuing, and routing transactions. A transaction processing system may also handle mixed transactions (e.g., receive a telephone call and respond to the call using electronic mail).

Embodiments of the present invention provide systems for compiling a graphical representation of a transaction flow into a series of routing instructions (e.g., a routing table) or into a native language of the transaction processing system. Similarly, embodiments of the present invention are capable of compiling a series of routing instructions (or native language data) into a graphical representation of the transaction flow.

Hardware Environment

FIG. 1 shows an embodiment computer hardware environment that may be used with the present invention. The present invention can be implemented using a computer 100, wherein computer 100 includes a processor, a random access memory (RAM), and a read-only memory (ROM) and/or other components. Computer 100 may be coupled to various I/O devices, such as a monitor 102, a keyboard 108, a pointing device 110, fixed and/or removable data storage devices 112 and 114, and a printer 118. Monitor 102 can be any type of display device capable of displaying information to a user of the computer system. Keyboard 108 can be any type of user input device, such as a keyboard-based device, a handwriting recognition system, or a voice recognition system. Pointing device 110 can be a mouse, touch pad, track ball, light pen, or any other device capable of moving a cursor on a computer display device. Computer 100 may also be coupled to other I/O devices, including a local area network (LAN) or wide area network (WAN) via an interface cable 120. Those of ordinary skill in the art will recognize that any combination of the above components, or any number of different components, peripherals, and other devices, may be used with computer 100. Computer 100 may be a general purpose computer or a computer specifically designed for use with a transaction processing system.

Generally, computer 100 operates under the control of an operating system. An embodiment of the present invention is implemented using one or more computer programs or applications, which are represented by a window 124 displayed on monitor 102. Various computer programs and applications operate under the control of the operating system. The operating system and computer programs are loaded from a data storage device (such as a hard disk drive, diskette, or CD-ROM) into the memory of computer 100 for use during actual operations. Alternatively, the operating system or computer programs may be retrieved or downloaded from a remote system (such as a server).

In a particular embodiment of the invention, the operating system and the computer program are embodied in a computer-readable medium, such as data storage devices 112 and/or 114 which could include one or more fixed or removable data storage devices, such as a floppy disk drive, hard drive, CD-ROM drive, tape drive, etc. Further, the operating system and the computer programs include instructions which, when read and executed by computer 100, causes computer 100 to perform the steps necessary to implement or utilize the present invention. It will be appreciated that various modifications may be made to this configuration, including the number, size, and types of components, without departing from the scope of the invention.

A method and apparatus are described for performing compilation of transaction processing workflows (also referred to as transaction flows). The use of "transaction flow" or "workflow" herein shall be understood to include any flow (or subflow) of steps or procedures used in a transaction processing system. Furthermore, the terms "transaction flow" and "workflow" are used interchangeably herein. In the following description, for purposes of explanation, numerous specific details are set forth in order to provide a thorough understanding of the present invention. It will be evident, however, to one of ordinary skill in the art that the present invention may be practiced without these specific details. In other instances, well-known structures and devices are shown in block diagram form in order to facilitate description.

In one embodiment, steps and procedures according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

System Organization

Figure 2:
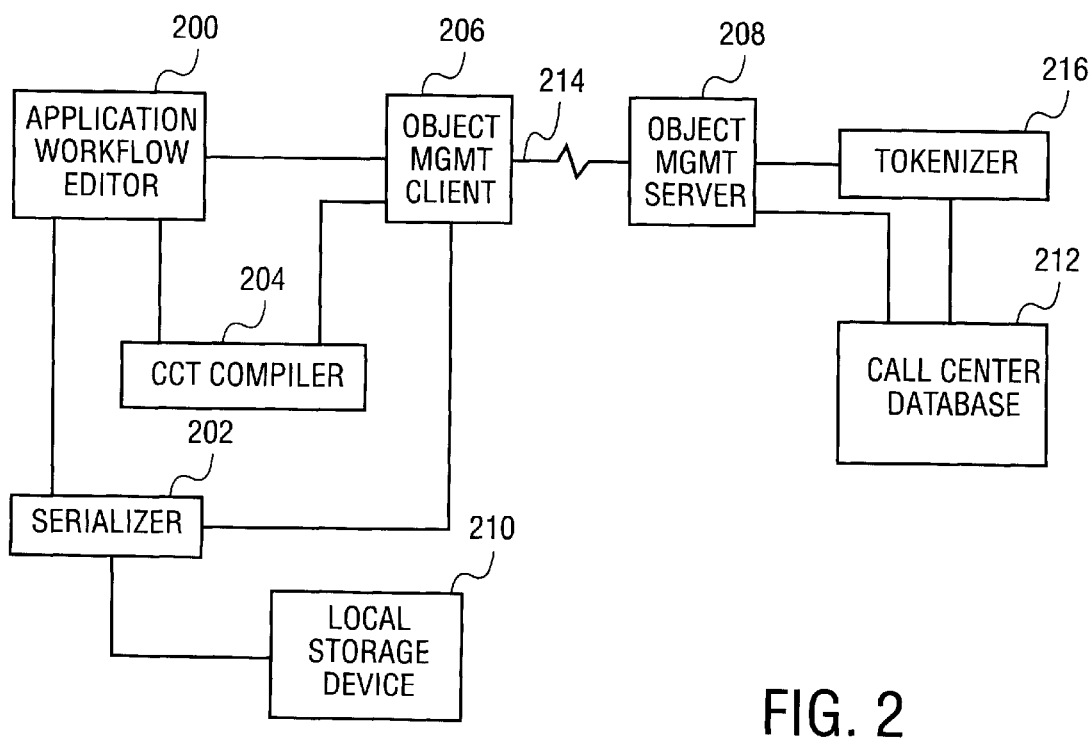
FIG. 2 is a system diagram that shows a system architecture compatible with the present invention.

FIG. 2 shows a diagram of an exemplary organization of a transaction processing system that can be used with the present invention. However, it will be appreciated that the present invention may be used with any type of transaction processing device or system, such as an automatic call distributor (ACD). Furthermore, the present invention can be used in environments having one or more remote computer systems capable of executing applications on a server (e.g., a file server, an information server, or a database server).

An application workflow editor (AWE) 200 provides a workflow diagram containing the visual primitives (also referred to as steps or step objects) of a transaction flow through a transaction processor (such as a telephone call router). AWE 200 is capable of generating, editing, and displaying various types of workflows that define the operation of a transaction processing system. AWE 200 provides the workflow diagram to a serializer 202 or a CCT compiler 204. CCT compiler 204 compiles workflow diagrams into a series of routing instructions or routing procedures (which may be stored in a routing table, such as a call control table (CCT)). A routing table (including a CCT) is any data structure that stores routing instructions or routing procedures for use by a transaction processing system. A transaction processing system may include any number of routing tables.

Workflow diagrams may be stored in various formats (including an object-oriented format) on local storage device 210. Local storage device 210 stores both the graphical diagram and the semantic information of workflow steps and their connections. In a particular embodiment of the invention, the storage device contains a complete set of workflows and subflows as a single entity. This entity may be a local file on a client, a named stream on an environment server, or stored as part of a call routing database. The format of the workflow diagram stored on local storage device 210 is typically created as an object-oriented serialization of the AWE data structure by serializer 202. Serializer 202 permits adding new step object types and data structures. Serializer 202 also provides for storing the workflow diagram representation in both a local file and in a call center database. CCT compiler 204 interprets semantic information from the AWE and generates routing instructions appropriate for execution by a call center or other transaction processing system.

The routing instructions generated by CCT compiler 204 are provided to a transaction processing system (e.g., the transaction processing system associated with call center database 212). The routing instructions generated by the compiler may be stored in the transaction processing system or stored in a storage device coupled to the compiler. In an embodiment of the invention, the routing instructions generated by the compiler are maintained by the compiler, or another device coupled to the compiler, and provided to the transaction processing system as needed. For example, the compiler provides the routing instructions to the transaction processing system on an instruction-by-instruction basis.

AWE 200 communicates with an object management client 206 to obtain configuration information. Object management client 206 communicates with an object management server 208 via communication link 214. Object management server 208 contains information about one or more transaction processing devices or transaction processing systems. Additionally, server 208 permits control and management of one or more call processing devices. A tokenizer 216 is coupled to the object management server 208. Tokenizer 216 is used to convert routing instructions or routing procedures into a native language of the transaction processing system. A call center database 212 (also referred to as a transaction routing database), contains one or more routing tables and other information regarding the operation of a call center associated with call center database 212. In the call processing system of FIG. 2, the call center (and its associated database 212) may be referred to as a "server", and the components to the left of communication link 214 may be referred to as a "client". Although FIG. 2 illustrates a transaction processing system having a single database 212, alternate embodiments of the invention may contain any number of databases.

Figure 3:
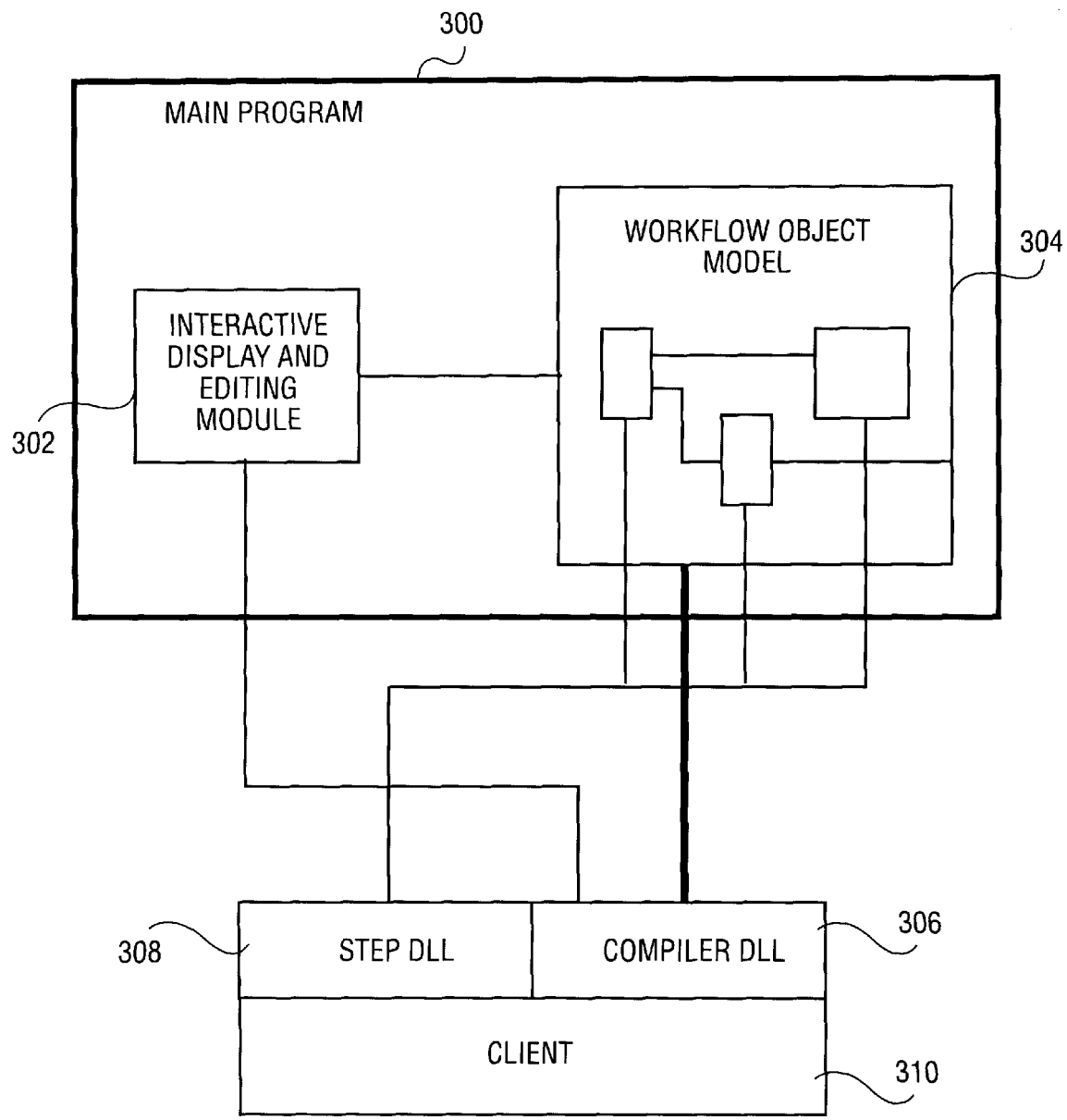
FIG. 3 is a system diagram illustrating an embodiment of the relationship between software modules compatible with the present invention.

The relationship between software modules compatible with the present invention is shown in FIG. 3. A main program 300 contains both an interactive display and editing module 302 and a workflow object model 304. Editor commands from editing module 302 create and modify workflow model 304. Each step contained in workflow model 304 is defined in a library of steps, which provide an object method for the display, configuration, and save/restore functions of each object by a step dynamic link library (DLL) 308. A compiler DLL 306 accepts a reference to the entire workflow object model 304, and uses both the workflow object model 304 and the library of steps to convert the workflow object model 304 into a form that can be executed by a client 310. Client 310 may, for example, control the operation of a call center or other transaction processing system or equipment.

Application Workflow Editor

The AWE 200 of the present invention defines various types of transaction processes as workflows for automatic call distribution, computer telephony integration, interactive response, and related transaction processing applications. AWE 200 employs a graphical user interface capable of illustrating various workflows. AWE 200 creates a workflow application, consisting of a series of procedural workflow steps, in a control flow. Each workflow step is represented within AWE 200 as an icon or step (also referred to as a visual primitive). Each step can have one or more inputs and one or more outputs. The steps are sequenced by connectors to define the workflow. Connectors are lines that define the flow of control between steps. A connector links the output of one step to the input of another step.

In an embodiment of the invention, AWE 200 is implemented as an object framework bundled with workflow step object classes. Programming an application consists of creating instances of step objects, specifying their properties, and connecting them to other step objects. From an application developer's perspective, the programming power of AWE 200 is largely determined by the capabilities of the step object classes that are bundled with it. This creates an open application development tool in which new step object classes may be added. AWE 200 creates distributed workflows, which may execute on multiple homogeneous or heterogeneous workflow engines.

AWE 200 is capable of displaying multiple portions of a workflow simultaneously by using multiple windows. This "split window" display is useful for viewing large workflows that extend beyond the boundaries of the display window. Each of the multiple windows can be scrolled independently of the other windows to display the desired portion of the workflow. Additionally, AWE 200 permits establishing connections between visual primitives in different windows.

A typical workflow editor provides multiple functions or operations to generate workflows. The following functions represent an exemplary set of functions that can be used to create an object without using deserialization. Serialization refers to the process of storing the state and attributes of an object. Thus, deserialization is the retrieving of the state and attributes of an object.

1. CreateStep. Creates a step and inserts it into a workflow.

2. CreateExternalConnector. Creates an external connect point.

3. CreateConnection. This function creates a connection between two visual primitives. For example, the connection may be between steps or between a step and a label.

4. InsertObject. Inserts an object into the workflow. This function is used for deserialization and deserialization from undo.

5. RemoveObject. Removes an object from the workflow. The function updates the layout map and removes any references to the object. If the object is a step or other connectable object, then all connections to the step are deleted.

6. GetInputStep. Returns the connection's destination (the input step) whether it is connected by an explicit connection or using connect-by-name. The object model structures represent the visual structure of the diagram. This means that semantically equivalent connections, one using an explicit connection line and another using a label to connect-by-name, have different object representations. This function hides this difference in other modules, such as the compiler.

Various procedures are discussed below with reference to FIGS. 4–6. These procedures refer to call centers and call control tables (CCTs) for purposes of illustration. However, it will be appreciated that the teachings of the present invention and, in particular, the procedures discussed below, may be used in any transaction processing system using any type of data structure for handling transaction routing instructions and transaction routing procedures.

Figure 4:
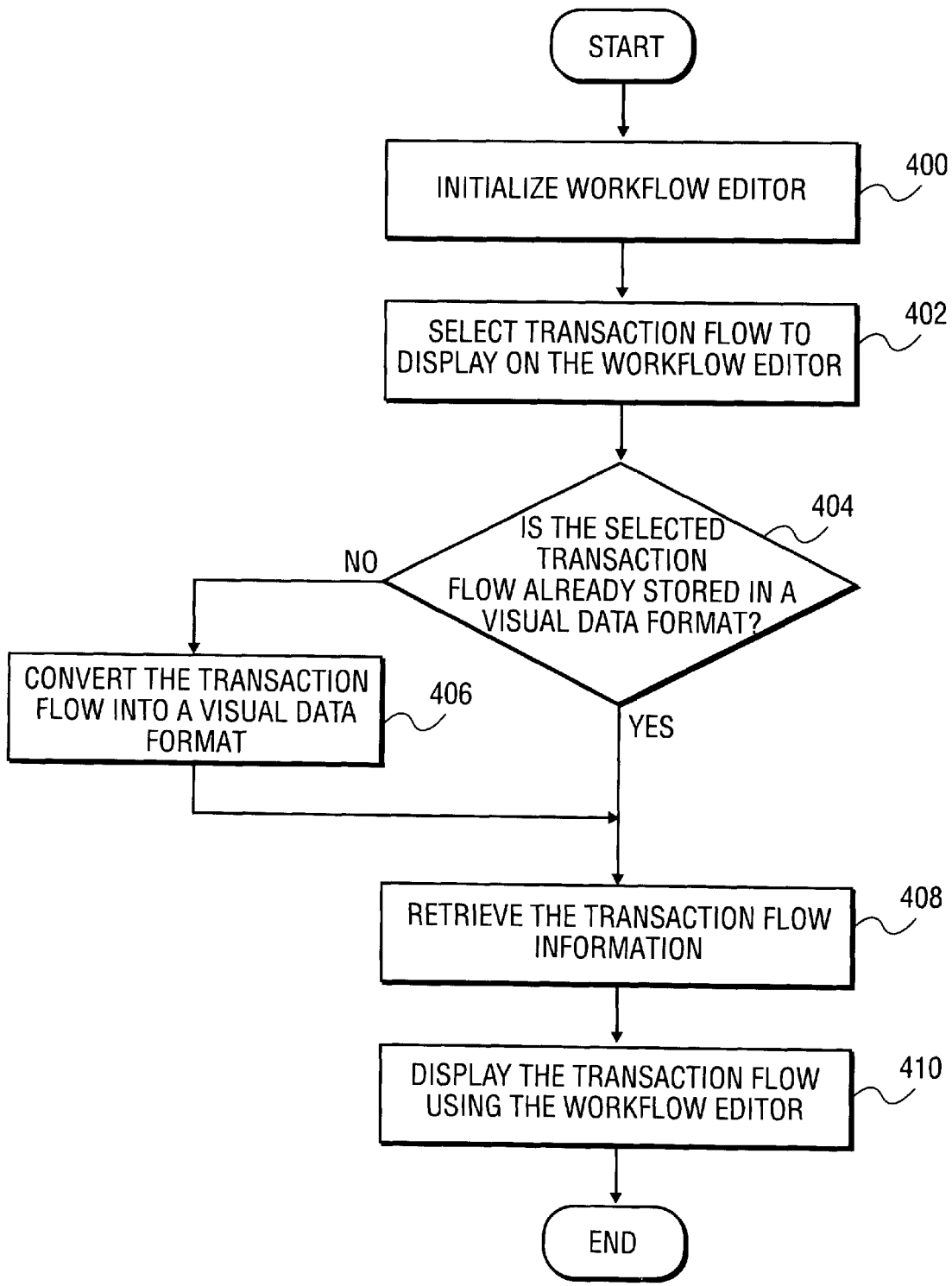
FIG. 4 is a flow diagram illustrating an embodiment of a procedure for displaying a transaction flow.

The overall procedure for displaying a transaction flow is illustrated in the flow diagram of FIG. 4. At step 400, the procedure initializes a workflow editor. The workflow editor is capable of retrieving, displaying, and editing various workflows, such as transaction flows. At step 402, a transaction flow is selected for display on the workflow editor. This selection may occur as a result of a user input which selects among multiple transaction flows (e.g., selecting from a list of available transaction flows). Alternatively, a default transaction flow may be selected if no other input is provided.

At step 404, the procedure determines whether the selected transaction flow is already stored in a visual data format (i.e., a representation using visual primitives). As discussed in greater detail below, a particular transaction flow can be stored in various formats. For example, a transaction flow may be stored in a visual transaction flow data format, a routing table data format, or in a native language of the transaction processing system. If the selected transaction flow is not already stored in a visual data format, then the procedure branches to step 406 where the transaction flow is converted into a visual data format. Additional details regarding the conversion of a transaction flow into a visual data format are provided below with respect to FIG. 6.

The procedure continues from step 404 or 406 to step 408, where the transaction flow information is retrieved into the workflow editor. At step 410, the workflow editor displays the transaction flow retrieved at step 408. At this point, the transaction flow may be observed, analyzed, or edited using the workflow editor.

Figure 5:
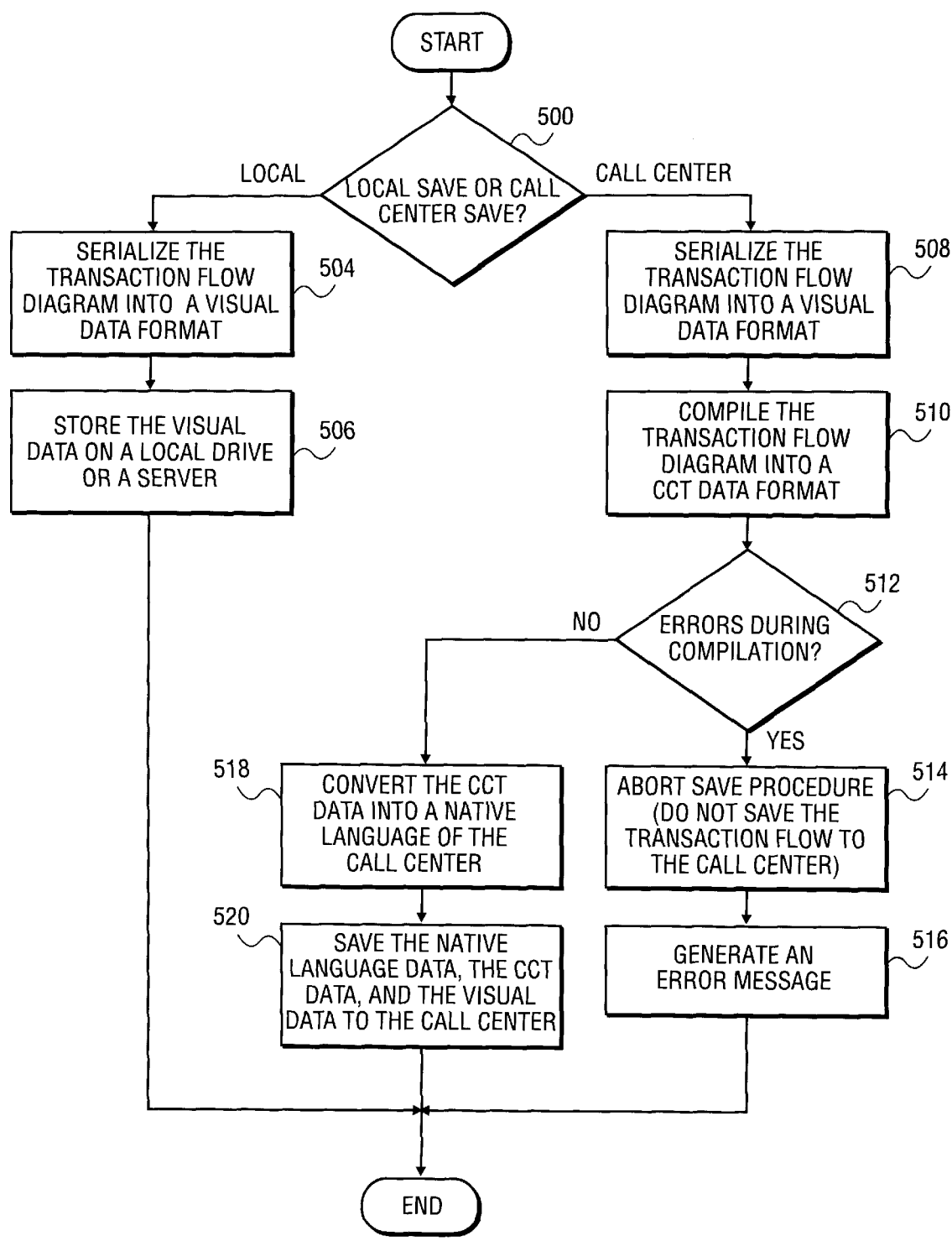
FIG. 5 is a flow diagram illustrating an embodiment of a procedure for saving and compiling a visual transaction flow.

FIG. 5 is a flow diagram illustrating an embodiment of a procedure for saving and compiling a visual transaction flow. The procedure illustrated in FIG. is initiated by a user after creating or editing a transaction flow using the workflow editor. At step 500, the procedure determines whether a local save or a call center save has been selected. A local save stores the transaction flow on a local computer or a server, but not on a call center. A call center save is used to store the transaction flow on a call center for execution by the call center. If a local save has been selected, the procedure branches from step 500 to step 504 where the transaction flow diagram is serialized into a visual data format. Serializing the transaction flow refers to the conversion of the graphical layout of visual primitives into a serial sequence of data that represents the transaction flow diagram. The procedure then continues to step 506 where the visual data is stored on a local drive or a server. A server may be used in situations where the workflow editor is executed on a remote system. The stored visual data can be retrieved from the local drive or server at a later time for further editing or viewing using the workflow editor.

If a call center save is identified at step 500, the procedure branches to step 508 to serialize the transaction flow diagram into a visual data format. As mentioned above, a call center save refers to the process of storing the transaction flow in a call center to be executed by the call center. In contrast, the local save discussed above, saves the transaction flow diagram on a local drive or a server, without storing the transaction flow in the call center or otherwise affecting any transaction flows executing in the call center. The local save is used when a transaction flow is being developed or modified, and is not yet ready to be executed by a call center.

At step 510, the transaction flow diagram is compiled into a CCT format. Step 512 determines whether any errors occurred during compilation of the transaction flow diagram into the CCT format. If errors were detected during the compilation, the procedure branches from step 512 to step 514 to abort the save procedure. In this situation, the transaction flow is not saved to the call center, because errors were detected. Errors may be caused by improperly connected steps in the transaction flow, unconnected inputs or outputs, or attempting to perform steps not supported by the call center to which the save was attempted.

An erroneous or invalid transaction flow may disrupt the operation of the call center or cause a call center failure. Therefore, the erroneous or invalid transaction flow is not saved or otherwise stored in the call center. At step 516, an error message is generated indicating that errors occurred during the compilation of the transaction flow. Additionally, the error message may indicate the particular errors that occurred and the cause or source of the errors. Although an erroneous or invalid transaction flow is not saved to the call center, the transaction flow diagram may be saved on a local drive or a server, as discussed above with respect to the local save procedure.

If step 512 does not detect any errors during compilation of the transaction flow diagram, then the procedure branches to step 518 where the CCT data is converted into a native language of the call center to which the transaction flow is being saved. The native language of the call center is the actual code or data sequence that is executed by the call center in its native language. The procedure then continues to step 520 where the native language data, the CCT data, and the visual data is saved to the call center. At this point, the call center can execute the transaction flow using the native language data.

Figure 6:
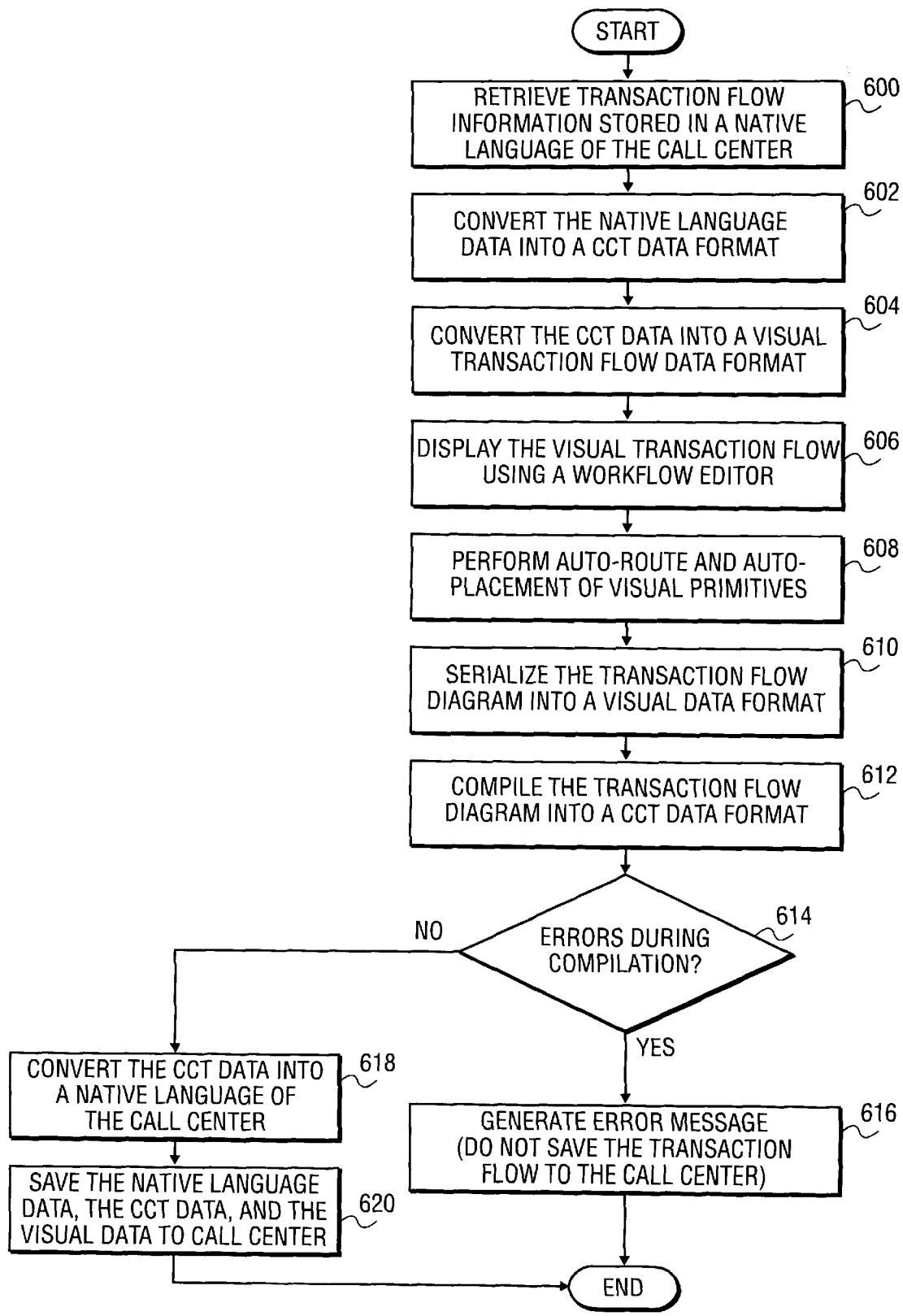
FIG. 6 is a flow diagram illustrating an embodiment of a procedure for converting a non-visual transaction flow representation to a visual transaction flow representation.

FIG. 6 is a flow diagram illustrating an embodiment of a procedure for converting a non-visual transaction flow representation to a visual transaction flow representation. Typically, the procedure illustrated in FIG. 6 is performed once for each transaction flow (e.g., when upgrading from a CCT-based transaction flow editor to a visual transaction flow editor). After the transaction flow has been converted into a visual transaction flow representation, future editing and display of the transaction flow is accomplished using the visual representation of the transaction flow. Furthermore, particular embodiments of the invention overwrite a previous CCT or native language data format as part of the conversion process.

At step 600 of FIG. 6, the procedure retrieves transaction flow information stored in a native language of the call center. For example, the transaction flow information is may be retrieved from a call center database. At step 602, the procedure converts the native language data into a CCT data format. Step 604 then converts the CCT data into a visual transaction flow data format. Step 606 displays the visual transaction flow on the workflow editor using the visual transaction flow format data generated in step 604. Step 608 performs automatic placement of the visual primitives that represent the transaction flow and automatic routing of connections between the steps of the transaction flow. This automatic placement and routing can be used to arrange the visual primitives in a logical manner. Alternate embodiments of the invention do not perform the automatic placement and routing. Instead, these alternate embodiments allow the user of the workflow editor to reposition visual primitives and reroute connections as desired.

At step 610, the procedure serializes the transaction flow diagram into a visual data format. The serialization of the transaction flow diagram is similar to the serialization steps described above in FIG. 5. At step 612, the procedure compiles the transaction flow diagram into a CCT data format. This compilation procedure may overwrite the previous CCT data generated in step 602. The procedure then continues to step 614 to determine whether any errors occurred during the compilation of the transaction flow diagram into a CCT data format. If errors are detected at step 614, the procedure continues to step 616 where an error message is generated. As discussed above with respect to FIG. 5, if an error occurs during the compilation of a transaction flow diagram, the CCT data is not saved to the call center and no changes are made to any existing transaction flows executing on the call center.

If no errors occurred during compilation of the transaction flow, the procedure of FIG. 6 continues from step 614 to step 618 where the CCT data is converted into a native language of the call center. Next, step 620 saves the native language data, the CCT data, and the visual data to the call center (e.g., the call center database). Saving the native language data and the CCT data to the call center may overwrite existing native language data and CCT data associated with the transaction flow. At this point, the call center may execute the transaction flow using the native language data.

Figures 7, 8:
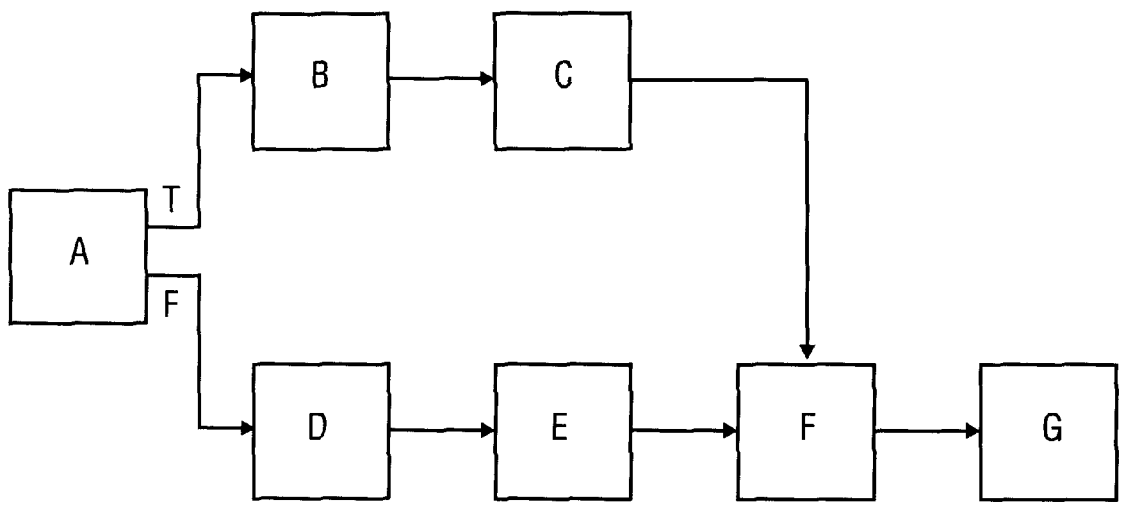
FIG. 7 illustrates an exemplary visual transaction flow diagram.
FIG. 8 illustrates an example of the visual transaction flow diagram of FIG. 7 serialized into a visual data format.

FIG. 7 illustrates an exemplary visual transaction flow diagram. The transaction flow begins at step A, which is a conditional step that generates a true or a false result. Step A branches to step B if the result is true and branches to step D if the result is false. If the transaction flow branches from step A to step B, then the flow continues to step C and then to step F. If the transaction flow branches from step A to step D, then the flow continues to steps E, F, and G. Step G is the last step in the transaction flow.

FIG. 8 illustrates an example of the visual transaction flow diagram of FIG. 7 serialized into a visual data format. The visual data format represents a single stream of instructions or procedures. The arrangement of information in FIG. 8 is provided for purposes of illustration only. Embodiments of the invention may store serialized data in any arrangement or configuration using any data structure. An instruction 800 (corresponding to step A in FIG. 7) tests the condition of step A and determines whether the condition is false. If the condition is false, instruction 800 causes the flow to jump to step D. Otherwise, the flow continues to instructions 802 and 804 (corresponding to steps B and C in FIG. 7, respectively). Instruction 806 then causes the flow to jump to step F, where instructions 812 and 814 are executed. If instruction 800 caused the flow to jump to step D (instruction 808), the flow continues to steps 808, 810, 812, and 814. Thus, the series of instructions illustrated in FIG. 8 execute the same flow as the visual transaction flow shown in FIG. 7.

Various procedures and algorithms are available for traversing binary trees (i.e., converting a binary tree structure, such as the transaction flow shown in FIG. 7, to a linear stream of instructions). Procedures for traversing binary trees include In order, Preorder, and Postorder processes. After a linear stream of instructions has been generated, each instruction is converted to the native language of the transaction processing system. Typically, the conversion of an instruction into the native processing language involves identifying a native language instruction that corresponds to the instruction (i.e., the instruction in the linear stream), and creating a linear steam of native language instructions.

The particular native language instructions may be unique to a particular type of transaction processing system.

An embodiment of the invention uses ActiveX Controls in Microsoft Windows and Windows NT operating systems. However, the invention may also be used with other types of controls and different operating systems. The ActiveX Controls provide standard interfaces to enumerate properties and methods.

Described below are various functions, interfaces, and other information that may be utilized in a particular embodiment of the invention.

Call Center Interface

A Connect object is used to connect to a call center specified by the user in the logon dialog box. The Connect object returns TRUE if the connect to the server was successful, and returns FALSE otherwise.

Retrieve Optional Software

To determine the optional software installed on a call center, embodiments of the invention provide a function that returns the options available on the call center.

Enumerate Objects

Various objects may be capable of returning an enumeration of all objects of their kind in the call center database. Each object implements an enumerator function that returns a list of objects from the call center. For example, an enumerator function may return a list of all applications in the database. Another enumerator function returns a list of all CCTs in the database that belong to a particular application.

Database Compile, Save, and Load Interface

An exemplary set of functions to load and compile CCTs includes:

1. LockCCT. Attempts to lock CCT in the server so that it becomes writable only to the current user.
2. UnlockCCT. Attempts to unlock the CCT in the server so that it can be locked by another user.
3. CallControlTableWorkflow. Retrieves the CCT from the server with the specified CCT's information.
4. GetContent. Retrieves the CCT workflow content.
5. AddContent. Saves the CCT workflow content.
6. GetCCTData. Obtains CCT data from the server.
7. SetCCTData. Sets CCT data in the server.
8. CreateOnCallCenter. Attempts to create the locally— created CCT on the call center.
9. Compile. Compiles a workflow. Compiling a workflow is the process of converting the workflow to a CCT format.
10. Generate. Generates a workflow. Generating a workflow is the process of converting a CCT to a workflow.
11. Convert. Converts a compiled workflow from the compiler's internal structures into a compatible format for the server.

When a CCT is opened from a call center database, the main program first attempts to lock the CCT in the call center database so that no other user can edit the locked CCT except the current user. If the lock function succeeds, it retrieves the CCT from the server using the specified CCT information (e.g., CCT Number and CCT Version). Once the valid CCT is loaded, the CCT's content may be generated by the compiler.

When saving a CCT to a call center database, the main program ensures that the CCT will not be saved to itself if it is opened as read-only. The main program then attempts to lock the CCT in the database so that it becomes writable to the current user. Upon successful locking of the CCT, the main application compiles the CCT and checks for errors. If no error is found, the CCT is saved with the CCT information of the selected item.

The CCT compiler interface may be implemented with a pointer to the workflow. The CCT compiler returns an error code to indicate compile errors, compile warnings (but no errors), no CCT access, no server link, and other status information. In an embodiment of the invention, the error code is a bit mask, allowing the compiler to report the status of more than one area. The CCT compiler also modifies the workflow to attach compiler error and warning messages as properties.

If a compile is successful and the results are being saved, the CCT compiler interface ensures that both the compiled results and the serialized workflow are saved in a single transaction. In the general case, where multiple compilers may exist, the CCT compiler only needs to know about its own data representation, where the serialized data has the same structure for every domain.

Visual Representation

In addition to semantic relationships, the workflow object model 304 (FIG. 3) must also contain information regarding the appearance of the various objects in a workflow diagram. Each object inherits from a base object with a virtual function that returns its bounding rectangle. This rectangle must be registered in a layout map. The layout map is a container of all step objects in the associated transaction flow diagram. Subsequently, the layout map may be used for hit testing by checking to see if any of its registered rectangles overlap or are contained by another rectangle. A "hit" is registered if a rectangular region overlaps an existing step, object, connection line, or other visual primitive. An important part of the visual object model is representing labeled connectors and labeled connections. The labeled connector is visible as an object with a connection point, yet it is not a step object. Various layouts are used in the system, each containing particular information about a workflow. An example of information contained in the layout map includes:

1. Step layout. Steps are based on extensions of ActiveX controls. The step layout provides graphical information regarding the step (e.g., the bounding box associated with the step).
2. Connect point layout. The connect point is a zero width/zero height hot spot. It is preferably represented as a relative XY offset from the origin of the control. For hit testing, a small box centered around the connect point location is used.
3. Connection layout. In the simple case of unlabeled connections, a sequence of points defines the route from one connection point to another. The connection bounding box is defined to be the box that encloses all the points of the route.
4. Labeled connector layout. The connector has the position of the connector as well as the sequence of points for the route from a connection point to a labeled connector. The labeled connector also has a container of connections which reference it. The bounding box for the connector and its routing is registered in the layout map.
5. Text block layout. The layout uses the position of the bounding rectangle for the text and the text itself. The bounding rectangle for the text dynamically changes its size by expanding or reducing the margins (e.g., the bottom margin) of the bounding rectangle to accommodate the text.
6. Structures for fast hit testing. These include sets for horizontal and vertical line segments, a set for all objects sorted horizontally, and a set for all objects sorted vertically.

Working Data

In addition to the layout map described above, AWE 200 has additional data to support editing and display operations. The additional working data is associated with the top level workflow except for application preferences. Working data is built on-the-fly and applies to the current editing session. Working data is not typically saved as part of the serialization process. The additional data to support editing and display operations may include:

1. A selection container for all objects that are selected. The selection container includes pointers to various workflow objects. Run time type information can be used to determine the type of object selected. The selection container belongs to a workflow document object.
2. An undo list. The undo list stores the information needed to undo or redo a command. It has pointers to serialized data of the entire state of the workflow.
3. A simple container of all objects is used to return a subset container with objects that either intersect or are wholly contained by a bounding rectangle. The returned container is used to initialize the selection container.
4. Step object library. The step object library has information for each kind of step supported by the workflow. The library entries keep track of input and output connect point counts, the step icon, and other information related to the supported steps.
5. A dispatch map. The dispatch map is used to invoke the methods on a step object that is implemented as an ActiveX control.
6. Application preferences such as palette display, workspace display, and other configuration information.

While the invention is described in terms of various embodiments in a specific system environment, those of ordinary skill in the art will recognize that the invention can be practiced, with modification, in other and different hardware and software environments within the spirit and scope of the appended claims.

What is claimed is:

1. A method for compiling a plurality of visual primitives that represent a plurality of routing operations of a work flow used by an interaction system, wherein the method uses a digital computer, the method comprising:

displaying the plurality of visual primitives on a display device, each of the plurality of visual primitives representing a routing operation and being arranged by a user to represent the work flow;

facilitating edits by the user of the work flow by manipulating the plurality of visual primitives;

compiling the plurality of visual primitives that represent the plurality of routing operations of the work flow into a plurality of routing instructions, the plurality of routing instructions specifying the plurality of routing operations of the work flow with respect to an interaction to be performed within the interaction system; and providing the plurality of routing instructions to the interaction system.

2. The method of claim 1 further including storing the plurality of routing instructions in a routing table.

3. The method of claim 1 further accessing the work flow from a storage device remotely coupled to the digital computer.

4. The method of claim 1 wherein the providing of the plurality of routing instructions to the interaction system further includes saving the plurality of routing instructions to an interaction routing database contained in the interaction system.

5. The method of claim 1 further including converting the plurality of routing instructions into a native language of the interaction system.

6. The method of claim 5 further including saving the native language data to the interaction system.

7. The method of claim 1 wherein the providing of the plurality of routing instructions to the interaction system further includes verifying that errors did not occur during the compiling step.

8. A method for compiling a work flow used by an interaction system, wherein the method uses a digital computer having a visual display, the method comprising:

accessing a plurality of routing instructions from the interaction system, the plurality of routing instructions specifying routing operations that comprise the work flow within the interaction system;

compiling the plurality of routing instructions into a plurality of visual primitives representing the routing operations that comprise the work flow within the interaction system;

automatically displaying the plurality of visual primitives, representing the routing operations that comprise the work flow, on the visual display; and facilitating edits by a user to the work flow by manipulating the plurality of visual primitives.

9. The method of claim 8 further including compiling the plurality of visual primitives representing the routing operations that comprise the work flow into a routing table.

10. The method of claim 9 further including saving the routing table to the interaction system.

11. The method of claim 10 wherein the saving of the routing table to the interaction system overwrites an existing routing table on the interaction system.

12. An apparatus for compiling a plurality of visual primitives that represent routing operations of a work flow used by an interaction system, the apparatus comprising:

a display device to display the plurality of visual primitives, each of the plurality of visual primitives representing a routing operation and being arranged by a user to represent the work flow by manipulating the plurality of visual primitives;

a digital computer coupled to the display device;

a data storage device coupled to the digital computer to store the work flow;

a compiler operated by the digital computer and coupled to the data storage device, the compiler to access the work flow from the data storage device and compile the plurality of visual primitives that represent the routing operations of the work flow into a plurality of routing instructions, the plurality of routing instructions specifying the routing operations of the work flow with respect to an interaction within the interaction system; and a data transfer mechanism coupled to the compiler to provide the plurality of routing instructions to the interaction system.

13. The apparatus of claim 12 further including a visual display coupled to the digital computer to display the work flow.

14. The apparatus of claim 12 wherein the compiler further includes a verification mechanism to determine whether errors occurred during operation of the compiler.

15. The apparatus of claim 12 wherein the compiler is further to convert the plurality of routing instructions into a native language of the interaction system.

16. An apparatus for compiling a plurality of visual primitives that provide a visual representation of routing operations of a work flow used by an interaction system, the apparatus comprising:

displaying means for displaying the plurality of visual primitives, each of the plurality of visual primitives representing a routing operation and being arranged by a user to represent the work flow by manipulating the plurality of visual primitives;

computing means coupled to the displaying means;

data storage means coupled to the computing means for storing the work flow;

compiler means operated by the computing means and coupled to the data storage means, the compiler means for accessing the work flow from the data storage means and compiling the plurality of visual primitives that provide the visual representation of the routing operations of the work flow into a plurality of routing instructions, the plurality of routing instructions specifying the routing operations of the work flow with respect to an interaction within the interaction system; and data transfer means coupled to the compiler means for providing the plurality of routing instructions to the interaction system.

17. The apparatus of claim 16 further including display means coupled to the computing means for displaying the work flow.

18. The apparatus of claim 16 wherein the compiler means further includes verification means for determining whether errors occurred during operation of the compiler means.

19. The apparatus of claim 16 wherein the compiler means converts the plurality of routing instructions into a native language of the interaction system.

20. A computer software product including a medium readable by a processor, the medium having stored thereon a sequence of instructions which, when executed by the processor, cause the processor to:

display a plurality of visual primitives on a display device, each of the plurality of visual primitives representing a routing operation and being arranged by a user to represent the work flow by manipulating the plurality of visual primitives;

compile the plurality of visual primitives representing routing operations of a work flow into a plurality of routing instructions, the plurality of routing instructions specifying the routing operations of the work flow with respect to an interaction within a interaction system; and provide the plurality of routing instructions to the interaction system.

21. The computer software product of claim 20 further including instructions which, when executed by the processor, cause the processor to convert the plurality of routing instructions into a native language of the interaction system.

22. The computer software product of claim 20 further including instructions which, when executed by the processor, cause the processor to verify that errors did not occur during the compile instructions.

* * * * *